United States Patent
Nakagawa

(10) Patent No.: US 9,821,690 B2
(45) Date of Patent: Nov. 21, 2017

(54) VEHICLE SEAT

(71) Applicant: TOYOTA BOSHOKU KABUSHIKI KAISHA, Aichi-ken (JP)

(72) Inventor: Tetsuo Nakagawa, Aichi-Ken (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 15/222,186

(22) Filed: Jul. 28, 2016

(65) Prior Publication Data

US 2017/0028943 A1 Feb. 2, 2017

(30) Foreign Application Priority Data

Jul. 31, 2015 (JP) .................. 2015-151679

(51) Int. Cl.
*B60N 2/44* (2006.01)
*B60N 2/60* (2006.01)
*B60N 2/68* (2006.01)
*B60N 2/02* (2006.01)
*B60R 16/023* (2006.01)

(52) U.S. Cl.
CPC ............ *B60N 2/44* (2013.01); *B60N 2/0228* (2013.01); *B60N 2/6009* (2013.01); *B60N 2/682* (2013.01); *B60R 16/0239* (2013.01)

(58) Field of Classification Search
CPC .......... B60N 2/16; B60N 2/44; B60N 2/6009; B60N 2/682; B60N 2/0228; B60R 16/0239
USPC .......................................... 297/463.1, 463.2
See application file for complete search history.

(56) References Cited

U.S. PATENT DOCUMENTS

| 3,957,312 | A | * | 5/1976 | Bonnaud | B60N 2/12 248/424 |
| 4,248,479 | A | * | 2/1981 | Toda | B60N 2/2209 297/342 |
| 4,653,807 | A | * | 3/1987 | Hirose | B60N 2/2352 248/430 |
| 4,740,035 | A | * | 4/1988 | Kazaoka | B60N 2/66 297/218.1 |
| 4,786,109 | A | * | 11/1988 | Toya | B60N 2/44 297/463.1 X |
| 4,850,644 | A | * | 7/1989 | Kazaoka | B60N 2/0715 297/325 |
| 4,973,105 | A | * | 11/1990 | Itou | B60N 2/161 297/463.1 X |
| 5,007,682 | A | * | 4/1991 | Kuwabara | B60N 2/00 297/452.38 |

(Continued)

FOREIGN PATENT DOCUMENTS

JP 2000-153730 6/2000

*Primary Examiner* — Rodney B White
(74) *Attorney, Agent, or Firm* — Greenblum & Bernstein, P.L.C.

(57) ABSTRACT

A vehicle seat includes: a seat cushion; a shield; an electrical component disposed between a side face portion of the seat cushion and the shield and including attachment portions fixed to either one of the side face portion and the shield; and a locking bracket including first connection portions fixed to the either one, and a second connection portion connected to the other one, the locking bracket being placed so as to cover a part of the electrical component from the other-one side when the attachment portions and the first connection portions are fixed to the either one.

7 Claims, 6 Drawing Sheets

(56) References Cited

U.S. PATENT DOCUMENTS

| | | | | |
|---|---|---|---|---|
| 5,288,133 A * | 2/1994 | Mizushima | ........... | B60N 2/0705 297/463.2 X |
| 5,529,376 A * | 6/1996 | Jovan | ............ | B60N 2/015 297/463.1 X |
| 5,618,059 A * | 4/1997 | Kim | ............ | B60R 22/28 280/801.1 |
| 5,772,283 A * | 6/1998 | Yoshida | ............ | B60N 2/0292 297/463.1 X |
| 5,879,055 A * | 3/1999 | Dishner | ............ | B60N 2/0715 297/218.3 |
| 6,149,241 A * | 11/2000 | Waku | ............ | B60N 2/015 297/463.2 X |
| 6,585,321 B1 * | 7/2003 | Taguchi | ............ | B60N 2/0712 297/344.1 |
| 6,588,850 B2 * | 7/2003 | Matsuo | ............ | B60N 2/071 297/463.1 X |
| 7,237,846 B1 * | 7/2007 | Arima | ............ | B60N 2/6009 297/452.18 |
| 7,472,963 B2 * | 1/2009 | Jeong | ............ | B60N 2/0296 297/463.1 |
| 7,862,121 B2 * | 1/2011 | Ishijima | ............ | B60N 2/0296 297/367 R |
| 7,997,656 B2 * | 8/2011 | Inagaki | ............ | B60N 2/0224 297/463.1 X |
| 8,353,561 B2 * | 1/2013 | Yamazaki | ............ | B60N 2/44 297/463.1 X |
| 8,708,419 B2 * | 4/2014 | Shimamura | ............ | B60N 2/0705 297/463.1 X |
| 8,960,803 B2 * | 2/2015 | Mita | ............ | B60N 2/22 297/463.1 X |
| 9,022,477 B2 * | 5/2015 | Pleskot | ............ | B60N 2/06 297/463.1 X |
| 9,114,741 B2 * | 8/2015 | Nagata | ............ | B60N 2/4235 |
| 9,132,752 B2 * | 9/2015 | Pleskot | ............ | B60N 2/6009 |
| 9,216,667 B1 * | 12/2015 | Izawa | ............ | B60N 2/167 |
| 9,580,001 B2 * | 2/2017 | Sosnowski | ............ | B60N 2/58 |
| 9,630,528 B2 * | 4/2017 | Takei | ............ | B60N 2/6009 |
| 9,744,883 B2 * | 8/2017 | Nakagawa | ............ | B60N 2/16 |
| 2002/0050730 A1 * | 5/2002 | Kondo | ............ | B60N 2/002 297/217.3 |
| 2009/0026791 A1 * | 1/2009 | Ishijima | ............ | B60N 2/0296 296/65.18 |
| 2009/0026825 A1 * | 1/2009 | Ishijima | ............ | B60N 2/0296 297/358 |
| 2009/0051202 A1 * | 2/2009 | Ozeki | ............ | B60N 2/20 297/341 |
| 2009/0058158 A1 * | 3/2009 | Sobieski | ............ | B60N 2/0296 297/463.1 X |
| 2009/0267397 A1 * | 10/2009 | Kubota | ............ | B60N 2/169 297/344.15 |
| 2010/0109406 A1 * | 5/2010 | Ueda | ............ | B60N 2/0296 297/358 |
| 2012/0169101 A1 * | 7/2012 | Suzuki | ............ | B60N 2/12 297/354.1 |
| 2012/0181826 A1 * | 7/2012 | Sosnowski | ............ | B60N 2/002 297/217.1 |
| 2012/0313408 A1 * | 12/2012 | Nagata | ............ | B60N 2/4235 297/463.1 X |
| 2014/0217787 A1 * | 8/2014 | Fukuzawa | ............ | B60R 22/1952 297/216.1 |
| 2015/0306990 A1 * | 10/2015 | Nakagawa | ............ | B60N 2/6009 297/452.1 |
| 2015/0307010 A1 * | 10/2015 | Nakagawa | ............ | B60N 2/6009 297/452.18 |
| 2017/0028883 A1 * | 2/2017 | Kasuga | ............ | B60N 2/44 |
| 2017/0028942 A1 * | 2/2017 | Nakagawa | ............ | B60N 2/44 |
| 2017/0129374 A1 * | 5/2017 | Ortiz Hernandez | ..... | B60N 2/06 |

* cited by examiner

VEHICLE SEAT

INCORPORATION BY REFERENCE

The disclosure of Japanese Patent Application No. 2015-151679 filed on Jul. 31, 2016 including the specification, drawings and abstract is incorporated herein by reference in its entirety.

BACKGROUND OF THE INVENTION

1. Field of the Invention

The present invention relates to a vehicle seat.

2. Description of Related Art

There has been known a vehicle seat configured such that a shield is attached to a side face portion of a seat cushion. In the invention disclosed in Japanese Patent Application Publication No. 2000-153730 (JP 2000-153730 A), a recessed portion that is hollowed toward a direction of a side face portion of a seat cushion is formed in an outer face portion of a shield, and an electrical component is fitted into the recessed portion so as to be fixed thereto. In such a structure, in order to attach the shield to the side face portion of the seat cushion without backlash, it is conceivable that a locking portion is formed so as to extend from a part corresponding to the recessed portion of the shield toward the side face portion of the seat cushion and the locking portion is connected to the side face portion of the seat cushion. This makes it possible to connect the shield to the side face portion of the seat cushion at a position where the electrical component is disposed and to restrain the shield from wobbling with respect to the side face portion of the seat cushion.

SUMMARY OF THE INVENTION

In the meantime, in terms of a request in the design to cover the electrical component by the shield so that the electrical component is not viewed from outside, such a structure is conceivable that the electrical component is disposed in a space between the side face portion of the seat cushion and the shield. In this structure, since the electrical component disturbs, it is difficult to form the locking portion, at the position where the electrical component is disposed, such that the locking portion extends from the shield toward the side face portion of the seat cushion. In the structure in which the locking portion is formed so as to extend from the shield around the electrical component toward the side face portion of the seat cushion and the locking portion is connected to the side face portion of the seat cushion, the locking portion cannot be connected to a region opposed to the electrical component, in the side face portion of the seat cushion. For this reason, in a case where the electrical component has a large size, it is possibly difficult to restrain the shield from wobbling with respect to the side face portion of the seat cushion at the position where the electrical component is disposed.

The present invention provides a vehicle seat in which an electrical component is disposed in a space between a side face portion of a seat cushion and a shield, and the vehicle seat is able to restrain the shield from wobbling with respect to the side face portion of the seat cushion at a position where the electrical component is disposed.

A vehicle seat according to an aspect of the present invention includes: a seat cushion; a shield attached to a side face portion of the seat cushion; an electrical component disposed between the side face portion and the shield and including attachment portions fixed to a first member, the first member being either one of the side face portion and the shield; and a locking bracket including first connection portions fixed to the first member, and a second connection portion connected to a second member, the second member being the other one of the side face portion and the shield, the locking bracket being placed so as to cover a part of the electrical component from a second-member side when the attachment portions and the first connection portions are fixed to the first member.

According to the above aspect, when the attachment portions of the electrical component and the first connection portions of the locking bracket are fixed to the first member, the locking bracket covers a part of the electrical component from the second-member side. The locking bracket is provided with the second connection portion connected to the second member. This makes it possible to connect the shield to the side face portion of the seat cushion at a position where the electrical component is disposed and to restrain the shield from wobbling with respect to the side face portion of the seat cushion.

In the above aspect, the second connection portion may be connected to a region of the second member, the region facing the electrical component.

According to the above configuration, it is possible to connect the second connection portion to the region of the second member, the region facing the electrical component. This makes it possible to connect the shield to the side face portion of the seat cushion at a position closer to the position where the electrical component is disposed and to restrain the shield from wobbling with respect to the side face portion of the seat cushion.

In the above aspect, the locking bracket may be configured such that a plurality of leg portions is connected to each other by a girder portion, the plurality of leg portions each having a corresponding one of the first connection portions on one end side.

According to the above configuration, the plurality of leg portions is each configured to have a corresponding one of the first connection portions on one end side. Accordingly, the number of places to be fixed to the first member increases, thereby making it possible to more firmly restrain the wobbling.

In the above aspect, at least one of the first connection portions and at least one of the attachment portions may be put on top of one another and fixed together to the first member by a fastening member.

According to the above configuration, at least one of the first connection portions of the locking bracket and at least one of the attachment portions of the electrical component are put on top of one another and fixed together to the first member by the fastening member. Accordingly, in this part, it is possible to fix both the first connection portion of the locking bracket and the attachment portion of the electrical component to the first member by an operation of fastening one fastening member. This makes it possible to restrain a decrease in workability at the time of assembling.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

FIGS. 1 to 6 illustrate one embodiment of the present invention. The present embodiment is an example in which the present invention is applied to a seat cushion of a vehicle seat. In each of the figures, each direction of a vehicle at a time when the vehicle seat is attached to the vehicle is indicated by an arrow. In the following description, a description related to a direction shall be made on the basis of this direction.

Figure 1:
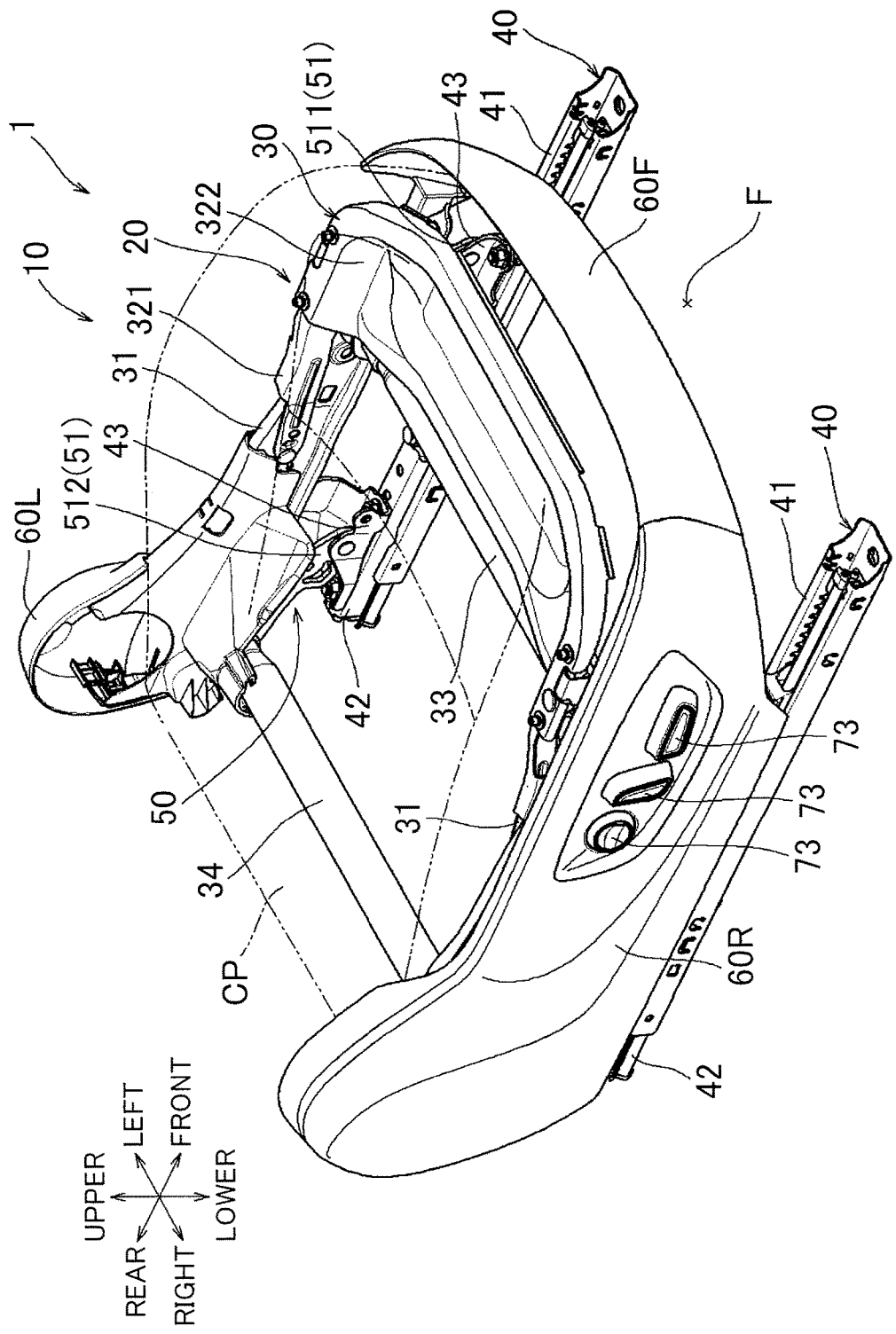
FIG. 1 is a perspective view illustrating a seat cushion of a vehicle seat according to one embodiment of the present invention.

As illustrated in FIG. 1, a seat cushion 10 of a vehicle seat 1 is configured such that a cushion pad CP, which is a cushioning material, is placed on a metal cushion frame 20 forming a framework, and then covered with a cushion cover (not illustrated) from above. A shield 60R is attached to a right side face portion of the seat cushion 10, a shield 60L is attached to a left side face portion thereof, and a shield 60F is attached to a front surface portion thereof. Since the cushion pad CP and the shields 60L, 60F have well-known configurations, descriptions thereof are omitted. The following describes the cushion frame 20 and the shield 60R.

As illustrated in FIG. 1, the cushion frame 20 is constituted by a frame body portion 30, a slide rail 40, and a lifter mechanism 50.

Figure 3:
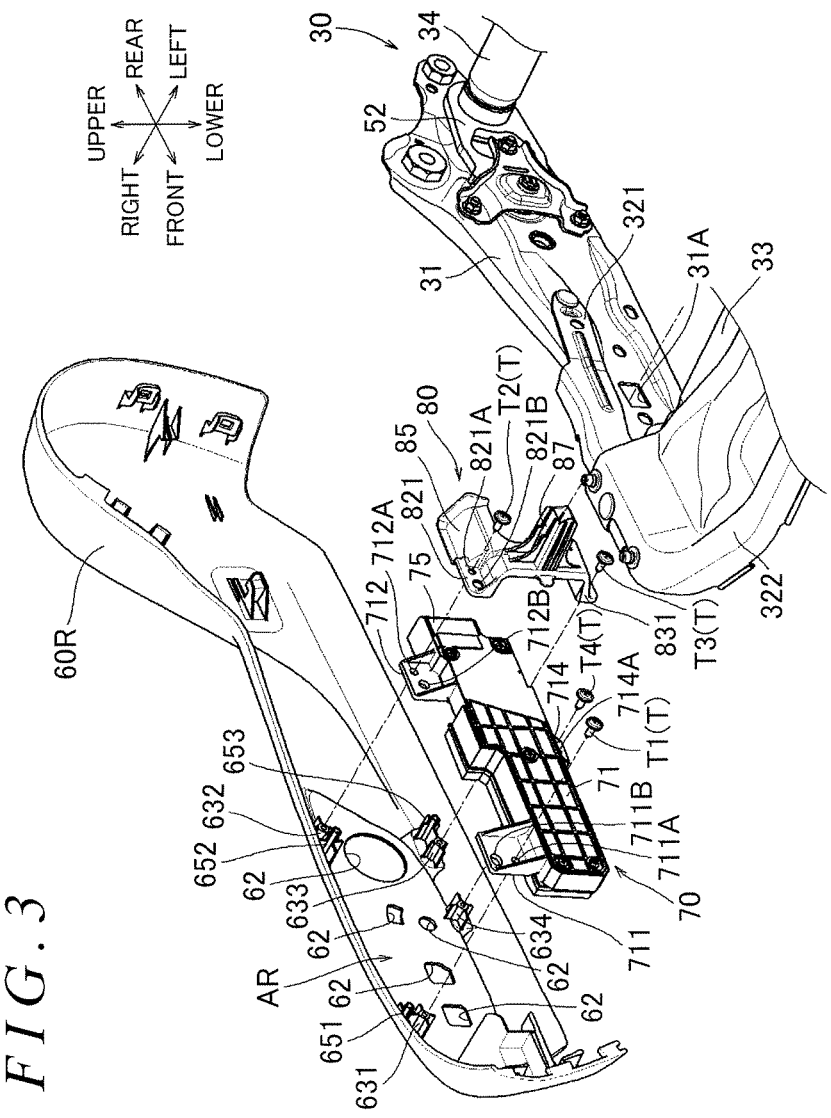
FIG. 3 is a view illustrating a right side frame in addition to an exploded perspective view of the right shield according to the above embodiment.

As illustrated in FIGS. 1 and 3, the frame body portion 30 is a structure formed in a generally square-frame shape in a top view, and includes: two side frames 31 on right and left sides; a front pipe 33 provided in a bridging manner between front ends of the right and left side frames 31 so as to be attached thereto; and a rear pipe 34 provided in a bridging manner between rear ends of the right and left side frames 31. Further, the frame body portion 30 also includes: panel arms 321 one ends of which are attached to respective side frames 31 at positions slightly rearward relative to the front pipe 33; and a front panel 322 connecting the other ends of the right and left panel arms 321. The one end of the panel arm 321 is supported by the side frame 31 pivotably in an up-down direction. This allows the front panel 322 to adjust its inclination angle relative to the side frame 31. The front pipe 33 and the rear pipe 34 are attached to the side frames 31 in a rotatable manner. An upper end of the after-mentioned lifter link 51 of the lifter mechanism 50 is attached to right and left ends of the front pipe 33 and the rear pipe 34 in a non-rotatable manner relative to the front pipe 33 and the rear pipe 34. Further, upper sides of rear ends of the side frames 31 are connected to a lower end of a seatback (not shown), which is a backrest portion of the vehicle seat 1, via a recliner (not shown). This allows the seatback to adjust its inclination angle relative to the seat cushion 10. A locking hole 31A is formed in a penetrating manner in the right side frame 31, slightly on a front side relative to a central part thereof in a front-rear direction. The locking hole 31A is a square hole through which a connection protruding portion 87 of the after-mentioned locking bracket 80 can be passed.

As illustrated in FIG. 1, the slide rail 40 includes a lower rail 41 fixed to a floor F and extending in the front-rear direction, and an upper rail 42 slidably assembled to the lower rail 41. Brackets 43 are attached to an upper face portion of the upper rail 42, at two places on front and back sides. A lower end of the after-mentioned lifter link 51 of the lifter mechanism 50 is supported by the bracket 43 in a rotatable manner in the up-down direction. That is, the side frame 31 of the frame body portion 30 is connected to the slide rail 40 via the lifter link 51.

As illustrated in FIG. 1, the lifter mechanism 50 is mainly constituted by the lifter link 51, the front pipe 33 and the rear pipe 34 of the frame body portion 30, and a brake mechanism (not shown). The lifter link 51 includes: two front links 511 (the front link 511 on the right side is not illustrated) on the right and left sides of a front side; and two rear links 512 (the rear link 512 on the right side is not illustrated) on the right and left sides of a rear side. As described above, an upper end of the front link 511 is connected to the front pipe 33 in a non-rotatable manner relative to the front pipe 33, and a lower end thereof is supported by the bracket 43 in a rotatable manner in the up-down direction. An upper end of the rear link 512 is connected to the rear pipe 34 in a non-rotatable manner relative to the rear pipe 34, and a lower end thereof is supported by the bracket 43 in a rotatable manner in the up-down direction. As illustrated in FIG. 3, a sector gear 52 is attached to the rear pipe 34 in a non-rotatable manner relative to the rear pipe 34, in the vicinity of a left face portion of the right side frame 31. The sector gear 52 is engaged with a pinion gear (not shown) of a brake mechanism attached to the right side frame 31. When the pinion gear of the brake mechanism rotates, the sector gear 52 rotates and the rear pipe 34 rotates. When the rear pipe 34 rotates, the rear link 512 is to rotate in the up-down direction around the rear pipe 34, so the front link 511 swings back and forth in synchronization with the rear link 512. Hereby, a height position of the frame body portion 30 with respect to the floor F is adjustable.

Figure 4:
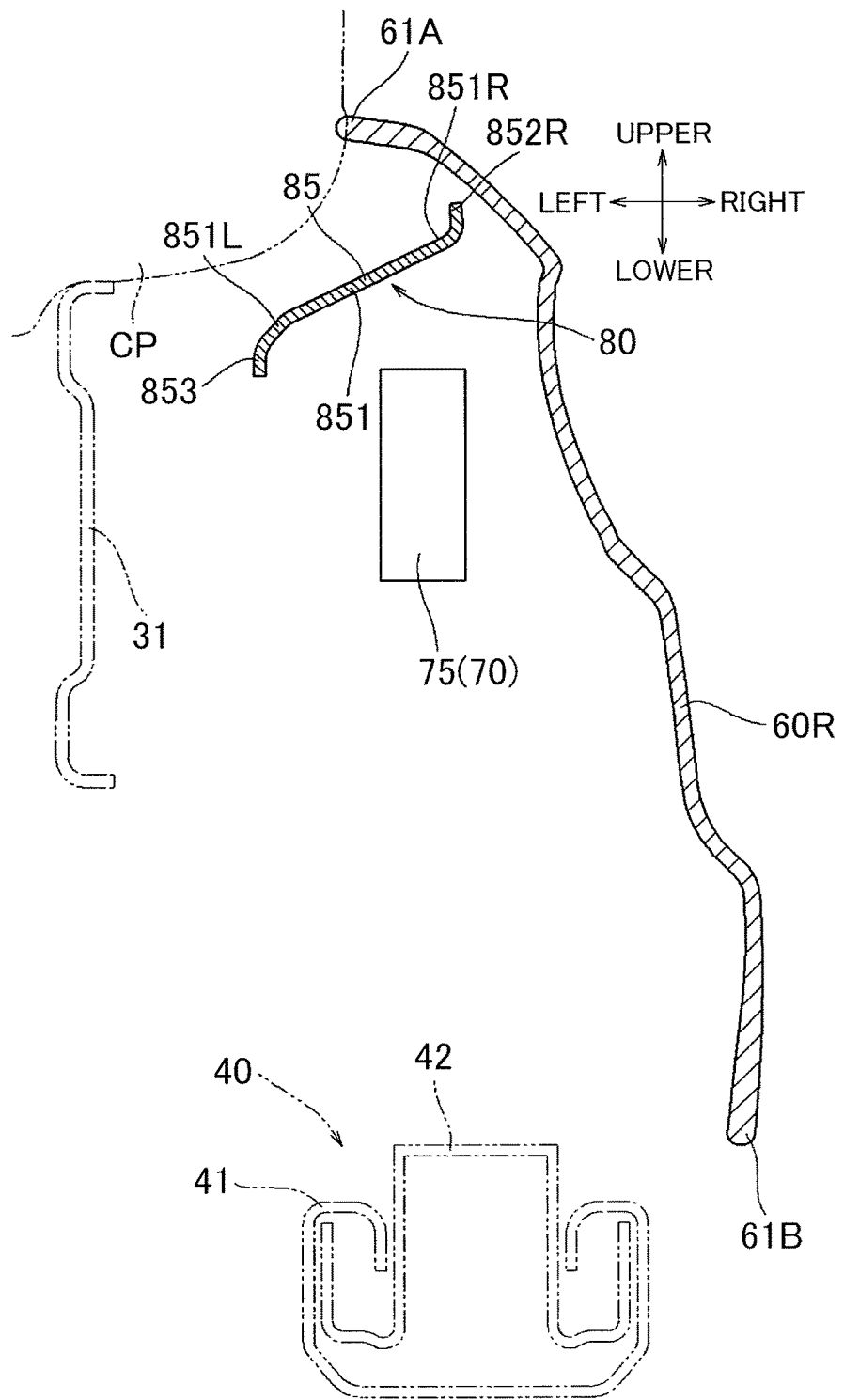
FIG. 4 is a sectional view taken along an arrow IV-IV in FIG. 2.

The shield 60R is a so-called outer shield. As illustrated in FIG. 1, the shield 60R is a resin product elongated in the front-rear direction and mainly covering the right side frame 31 from the right side. Note that a detailed description about a so-called inner shield (not shown) that covers a rear end of the right side frame 31 from the left side is omitted. As illustrated in FIG. 4, when the shield 60R is attached to the right side face portion of the seat cushion 10, an upper end 61A of the shield 60R is placed on the left side relative to a lower end 61B of the shield 60R. On this account, a space between the right side frame 31 and the shield 60R is opened downward. At this time, the upper end 61A of the shield 60R is pressed against a right side face portion of the cushion pad CP so as to make close contact therewith. As illustrated in FIG. 3, an attachment region AR is formed in a left side face portion of the shield 60R from around a front end to a central part in the front-rear direction. The attachment region AR is a region to which the after-mentioned switch member 70 and the after-mentioned locking bracket 80 are attached.

As illustrated in FIG. 3, in the attachment region AR, a plurality of holes 62, a plurality of internal screw thread portions (four internal screw thread portions 631, 632, 633, 634 in total in the present embodiment), and a plurality of projection portions (three projection portions 651, 652, 653 in total in the present embodiment) are formed. The holes 62 are through-holes via which the after-mentioned operating portion 73 is attached to the switch member 70 from the right side of the shield 60R at a time when a body portion 71 of the after-mentioned switch member 70 is attached to the attachment region AR. The internal screw thread portions are columnar bodies provided so as to project leftward from a left surface of the shield 60R, and internal thread holes are formed on respective left end surfaces thereof such that screw threads T can be screwed therein. The internal screw thread portions include: a first internal screw thread portion 631 formed in an upper part on a front side of the attachment region AR; a second internal screw thread portion 632 formed in an upper part on a rear side thereof; a third internal screw thread portion 633 formed in a lower part on the rear side thereof; and a fourth internal screw thread portion 634 formed in a lower part of a center thereof in the front-rear direction. The projection portions are columnar bodies provided so as to project leftward from the left surface of the shield 60R. The projection portions are formed in the vicinities of the first internal screw thread portion 631, the second internal screw thread portion 632, and the third internal screw thread portion 633, respectively. That is, the projection portions include: a first projection portion 651 formed integrally with the first internal screw thread portion 631 so as to be positioned in the vicinity of an upper side of the first internal screw thread portion 631; a second projection portion 652 formed integrally with the second internal screw thread portion 632 so as to be positioned in the vicinity of a front side of the second internal screw thread portion 632; and a third projection portion 653 formed integrally with the third internal screw thread portion 633 so as to be positioned in the vicinity of a rear side of the third internal screw thread portion 633. Left ends of the first projection portion 651, the second projection portion 652, and the third projection portion 653 project leftward relative to left ends of the first internal screw thread portion 631, the second internal screw thread portion 632, and the third internal screw thread portion 633, respectively.

Figure 2:
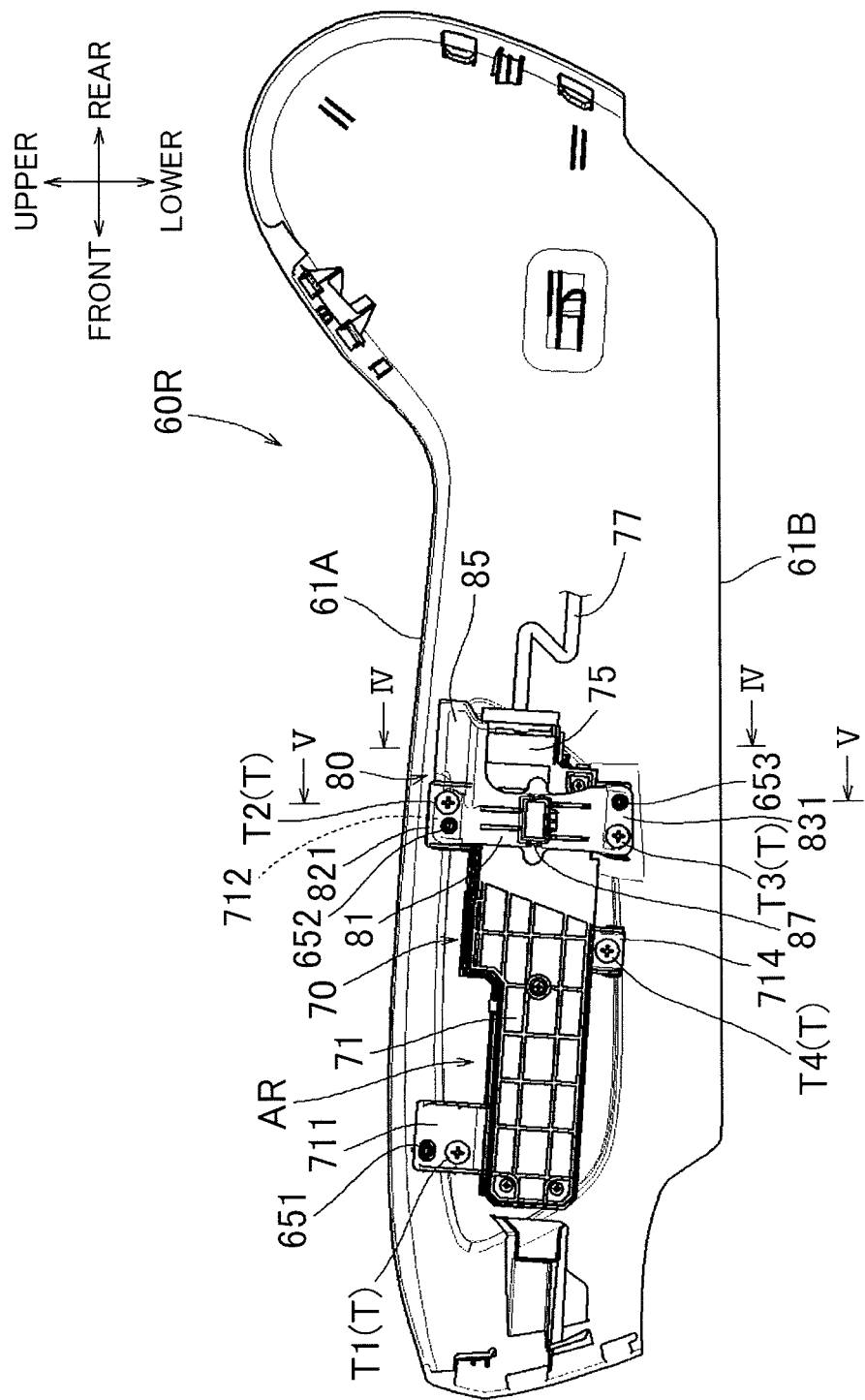
FIG. 2 is a left side view of a right shield according to the above embodiment.

The switch member 70 is an electrical component to which the operating portion 73 (see FIG. 1) is connected. The operating portion 73 is operable by a sitting person. The switch member 70 is configured as follows: when the switch member 70 detects the operating portion 73 being operated, the switch member 70 sends a signal to an electronic control unit (not shown) of a drive motor (not shown) that operates the panel arm 321, the slide rail 40, a recliner, the lifter mechanism 50, and so on. As illustrated in FIGS. 2 and 3, the switch member 70 is mainly constituted by the body portion 71 and a connector portion 75. The switch member 70 is an example of an "electrical component" in Claims.

As illustrated in FIGS. 2 and 3, the body portion 71 is a component configured such that an electrical component as a main part of the switch member 70 is covered with an outer shell having a generally box-like shape. The body portion 71 includes a front flange portion 711 extending upward from an upper part on a front side of the outer shell, a rear flange portion 712 extending upward from an upper part on a rear side thereof, and a central flange portion 714 extending downward from a central lower part thereof. More specifically, as illustrated in FIG. 3, when the body portion 71 is attached to the attachment region AR of the shield 60R, the front flange portion 711 is formed at a position corresponding to the first internal screw thread portion 631 and the first projection portion 651, the rear flange portion 712 is formed at a position corresponding to the second internal screw thread portion 632 and the second projection portion 652, and the central flange portion 714 is formed at a position corresponding to the fourth internal screw thread portion 634. Each of the front flange portion 711, the rear flange portion 712, and the central flange portion 714 has: a screw-thread hole configured such that a shaft portion of a screw thread T can be passed therethrough continuously with its corresponding internal screw thread portion, but a head of the screw thread T cannot be passed therethrough; and a positioning hole through which its corresponding projection portion can be passed. That is, the front flange portion 711 has a screw-thread hole 711A corresponding to the first internal screw thread portion 631, and a positioning hole 711B corresponding to the first projection portion 651. The rear flange portion 712 has a screw-thread hole 712A corresponding to the second internal screw thread portion 632, and a positioning hole 712B corresponding to the second projection portion 652. The central flange portion 714 has a screw-thread hole 714A corresponding to the fourth internal screw thread portion 634. The operating portion 73 (see FIG. 1) is attached to a right side face portion of the body portion 71. The operating portion 73 is a knob to be gripped by the sitting person sitting on a vehicle seat 1 for operation. The operating portion 73 is connected to the body portion 71 through the hole 62 (see FIG. 3) from the right side of the shield 60R in a state where the body portion 71 is attached to the attachment region AR. The front flange portion 711, the rear flange portion 712, and the central flange portion 714 are examples of a "attachment portions" in Claims.

The connector portion 75 is a part of the switch member 70, and is a part that is highly necessary to be protected so that a foreign matter does not abut therewith. The connector portion 75 has a generally box-like shape, and as illustrated in FIG. 2, the connector portion 75 is formed integrally with a rear end of the body portion 71. A communicating hole (not shown) that can be connected to a terminal portion (not shown) attached to a front end of a wiring harness 77 is formed in a rear end of the connector portion 75. When the terminal portion of the wiring harness 77 is connected to the communicating hole of the connector portion 75, the body portion 71 is electrically connected to the wiring harness 77 via the connector portion 75. The wiring harness 77 is formed by bundling a plurality of electric wires in an integrated manner, and is a cable material for supplying power to the body portion 71 and for sending a signal of the body portion 71 to the electronic control unit described above.

Figure 5:
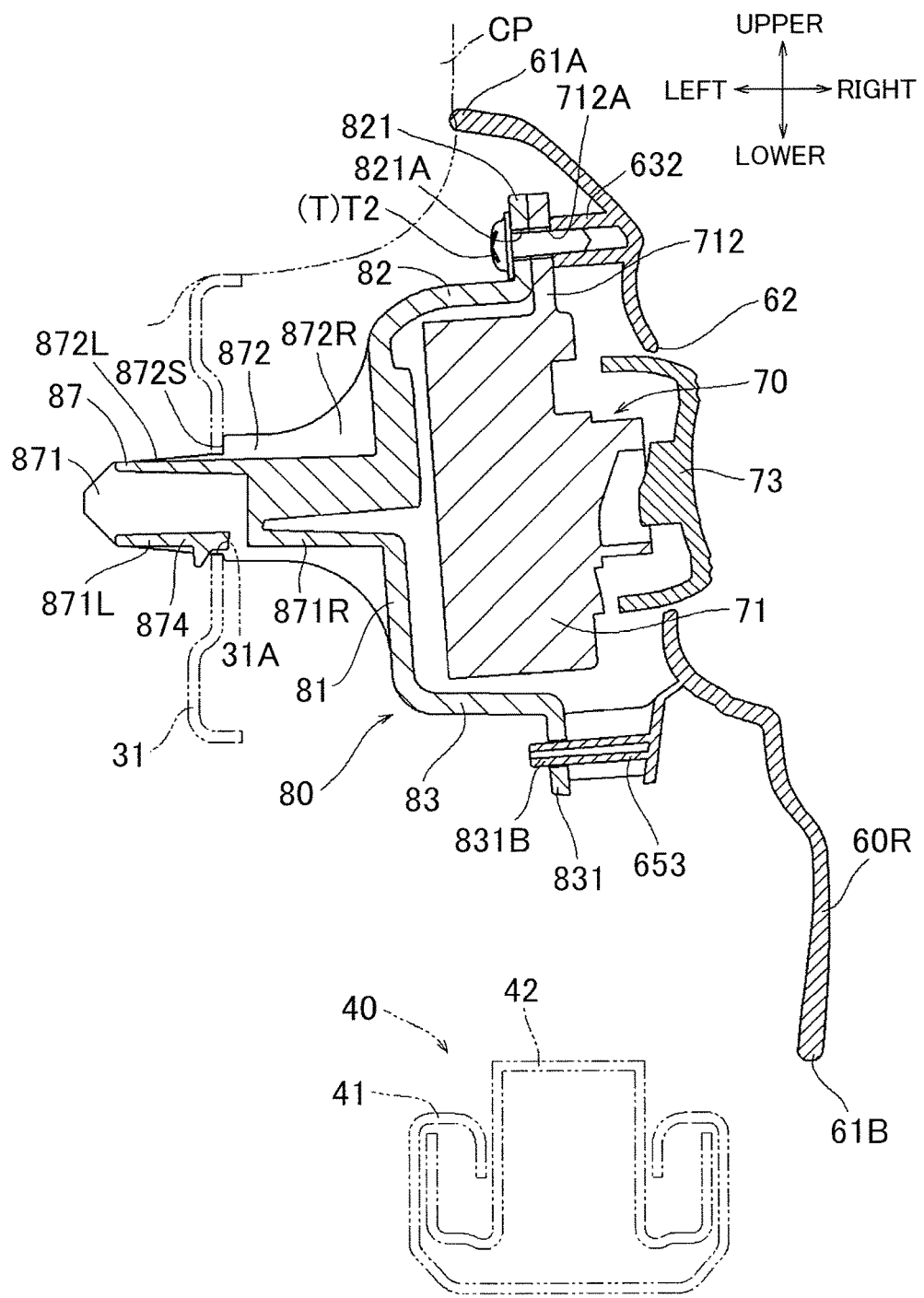
FIG. 5 is a sectional view taken along an arrow V-V in FIG. 2.
Figure 6:
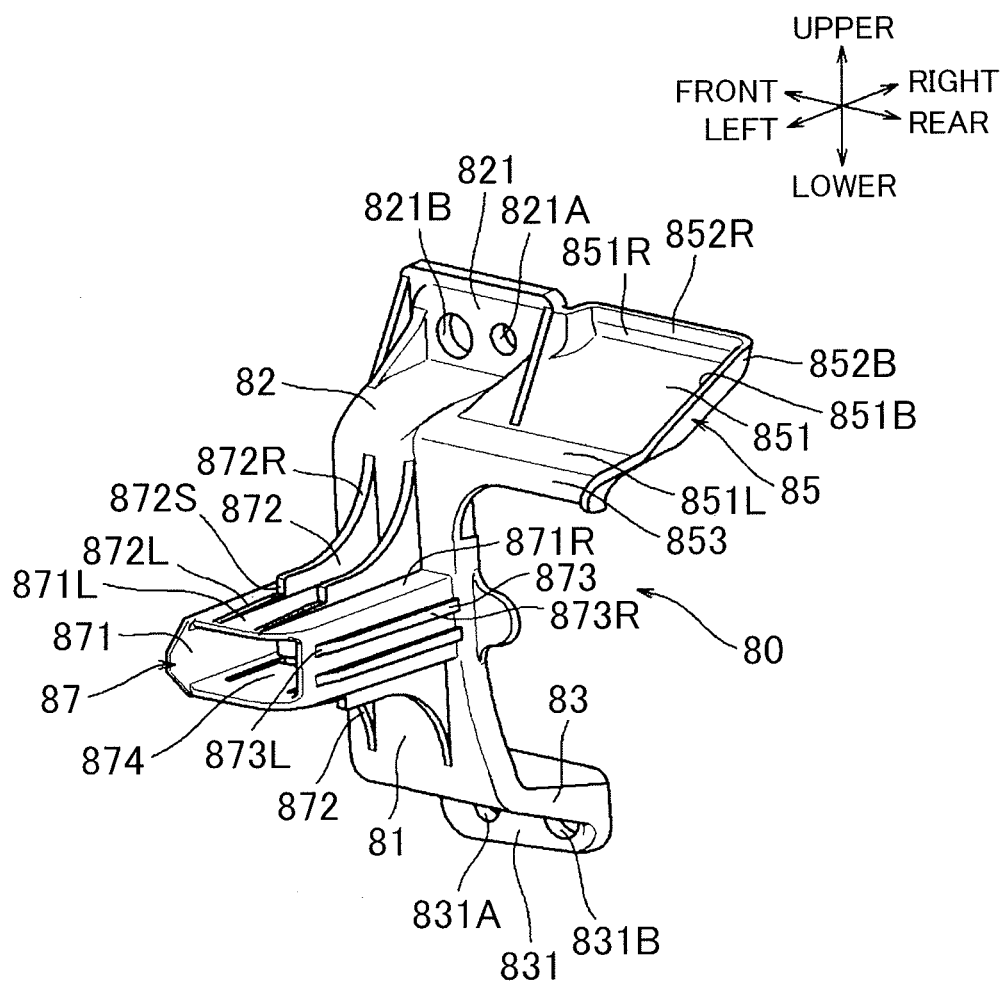
FIG. 6 is a perspective view of a locking bracket according to the above embodiment.

The locking bracket 80 is a resin member attached to the attachment region AR of the shield 60R. The locking bracket 80 is formed generally in a lateral Y-shape in a rear view. More specifically, as illustrated in FIG. 6, the locking bracket 80 mainly includes: a vertically extending portion 81 that extends in the up-down direction; a bilaterally extending portion 82 provided on an upper side so as to extend in the right-left direction from an upper end of the vertically extending portion 81; a bilaterally extending portion 83 provided on a lower side so as to extend in the right-left direction from a lower end of the vertically extending portion 81; a hood portion 85 continuously and integrally extending rearward from a rear end of the bilaterally extending portion 82 on the upper side; and a connection protruding portion 87 projecting leftward from a center of the vertically extending portion 81 in the up-down direction. As illustrated in FIG. 5, when the locking bracket 80 is attached to the attachment region AR of the shield 60R, generally a center of the vertically extending portion 81 in the up-down direction is placed between the switch member 70 and the right side shield 31. The vertically extending portion 81 is an example of a "girder portion" in Claims.

As illustrated in FIG. 6, an upper flange portion 821 extending upward is formed in a right end of the bilaterally extending portion 82 on the upper side, and a lower flange portion 831 extending downward is formed in a right end of the bilaterally extending portion 83 on the lower side. As illustrated in FIGS. 3 and 6, when the locking bracket 80 is attached to the attachment region AR of the shield 60R, the upper flange portion 821 is formed at a position corresponding to the second internal screw thread portion 632 and the second projection portion 652, and the lower flange portion 831 is formed at a position corresponding to the third internal screw thread portion 633 and the third projection portion 653. Each of the upper flange portion 821 and the lower flange portion 831 has: a screw thread hole configured such that a shaft portion of a screw thread T can be passed therethrough continuously with its corresponding internal screw thread portion, but a head of the screw thread T cannot be passed therethrough; and a positioning hole through which its corresponding projection portion can be passed. That is, the upper flange portion 821 has a screw-thread hole 821A corresponding to the second internal screw thread portion 632, and a positioning hole 821B corresponding to the second projection portion 652, and the lower flange portion 831 has a screw-thread hole 831A corresponding to the third internal screw thread portion 633, and a positioning hole 831B corresponding to the third projection portion 653. The bilaterally extending portions 82, 83 are examples of "leg portions" in Claims. The upper flange portion 821 and the lower flange portion 831 are examples of "first connection portions" in Claims.

As illustrated in FIG. 6, the hood portion 85 is a planar body formed so as to continuously and integrally extend rearward from the rear end of the bilaterally extending portion 82 on the upper side. The hood portion 85 is formed in a so-called shed-roof shape. More specifically, the hood portion 85 includes: a slope face portion 851 gradually inclined downward from the right side toward the left side; an upright wall portion 852R extending upward from a right end 851R of the slope face portion 851; an upright wall portion 852B extending upward from a rear end 851B of the slope face portion 851; and a suspended portion 853 extending downward from a left end 851L of the slope face portion 851. As illustrated in FIG. 4, the hood portion 85 is configured to be positioned above the connector portion 75 of the switch member 70 so as to cover an upper side of the connector portion 75 at a time when the locking bracket 80 is attached to the attachment region AR of the shield 60R. At this time, the right end 851R of the slope face portion 851 is positioned on the right side relative to the upper end 61A of the shield 60R, and the left end 851L of the slope face portion 851 is positioned on the left side relative to a left end face of the connector portion 75.

As illustrated in FIG. 3, when the locking bracket 80 is attached to the attachment region AR of the shield 60R and the shield 60R is then attached to the right side frame 31, the connection protruding portion 87 is provided at a position where the connection protruding portion 87 is opposed to the locking hole 31A of the side frame 31. As illustrated in FIG. 6, the connection protruding portion 87 is mainly constituted by a rectangular cylindrical portion 871, first reinforcing portions 872, and second reinforcing portions 873. The connection protruding portion 87 is an example of a "second connection portion" in Claims.

As illustrated in FIGS. 3 and 6, the rectangular cylindrical portion 871 is formed in a tubular shape that is opened on the left side, and a thickness thereof is slightly thinner than the locking hole 31A of the side frame 31. When the connection protruding portion 87 is inserted into the locking hole 31A of the side frame 31, a left part 871L of the rectangular cylindrical portion 871 is positioned on the left side of the side frame 31 and a right part 871R of the rectangular cylindrical portion 871 is positioned on the right side of the side frame 31. As illustrated in FIGS. 5 and 6, an engaging pawl 874 is formed on a bottom face of the left part 871L of the rectangular cylindrical portion 871. The engaging pawl 874 is configured to engage with a lower peripheral part of the locking hole 31A due to an elastic restoring force at a time when the connection protruding portion 87 is inserted into the locking hole 31A of the side frame 31.

As illustrated in FIG. 6, the first reinforcing portions 872 are ridges that reinforce the rectangular cylindrical portion 871 as diagonal-bracing, and extend from left parts 871L to right parts 871R in upper and lower walls of the rectangular cylindrical portion 871. Two first reinforcing portions 872 are provided side by side in the front-rear direction on each of the upper and lower walls of the rectangular cylindrical portion 871. In FIG. 6, in terms of the first reinforcing portions 872, a reference sign is assigned only to a representative one of them. A left part 872L of the first reinforcing portion 872 is a part corresponding to the left part 871L of the rectangular cylindrical portion 871, and extends so as to be inclined such that a projection dimension from a corresponding one of the upper and lower walls of the rectangular cylindrical portion 871 is gradually increased toward the right side. A right end of the left part 872L of the first reinforcing portion 872 is formed to have a dimension that allows the right end to abut with an opening of the locking hole 31A when the connection protruding portion 87 is inserted into the locking hole 31A of the side frame 31. Further, a right part 872R of the first reinforcing portion 872 is a part corresponding to the right part 871R of the rectangular cylindrical portion 871, and its right end integrally continues with the vertically extending portion 81. A stopper portion 872S extending perpendicularly to a corresponding one of the upper and lower walls of the rectangular cylindrical portion 871 is formed in a boundary between the left part 872L and the right part 872R of the first reinforcing portion 872.

As illustrated in FIG. 6, the second reinforcing portions 873 are ridges that reinforce the rectangular cylindrical portion 871 as diagonal-bracing, and extend from left parts 871L to right parts 871R of front and rear walls of the rectangular cylindrical portion 871. Two second reinforcing portions 873 are provided side by side in the up-down direction on each of the front and rear walls of the rectangular cylindrical portion 871. In FIG. 6, in terms of the second reinforcing portions 873, a reference sign is assigned only to a representative one of them. A left part 873L of the second reinforcing portion 873 is a part extending from near a left end of the left part 871L of the rectangular cylindrical portion 871 to a central part of the left part 871L in the right-left direction, and extends so as to be inclined such that a projection dimension from a corresponding one of the front and rear walls of the rectangular cylindrical portion 871 is gradually increased toward the right side. A right part 873R of the second reinforcing portion 873 is a part extending from a right end of the left part 873L to a right end of the right part 871R of the rectangular cylindrical portion 871, and a projecting dimension thereof from a corresponding one of the front and rear walls of the rectangular cylindrical portion 871 is constant. The right part 873R of the second reinforcing portion 873 is formed to have a dimension that allows the right part 873R to abut with the opening of the locking hole 31A when the connection protruding portion 87 is inserted into the locking hole 31A of the side frame 31. A right end of the right part 873R of the second reinforcing portion 873 integrally continues with the vertically extending portion 81.

Based on FIG. 3, the following describes a procedure of attaching the shield 60R to the right side face portion of the seat cushion 10. First, the switch member 70 is positioned with respect to the attachment region AR of the shield 60R. That is, the first projection portion 651 of the shield 60R is passed through the positioning hole 711B of the front flange portion 711 of the switch member 70, and the second projection portion 652 of the shield 60R is passed through the positioning hole 712B of the rear flange portion 712 of the switch member 70. Then, the locking bracket 80 is positioned with respect to the attachment region AR of the shield 60R. That is, the second projection portion 652 of the shield 60R is passed through the positioning hole 821B of the upper flange portion 821 of the locking bracket 80, and the third projection portion 653 of the shield 60R is passed through the positioning hole 831B of the lower flange portion 831 of the locking bracket 80. In this state, the switch member 70 and the locking bracket 80 are fastened to the shield 60R with screw threads T. That is, a screw thread T1 is passed through the screw-thread hole 711A of the switch member 70 and screwed into the first internal screw thread portion 631 so that the switch member 70 is fastened. Further, a screw thread T2 is passed through the screw-thread hole 821A of the locking bracket 80 and the screw-thread hole 712A of the switch member 70, and then screwed into the second internal screw thread portion 632 so that the locking bracket 80 and the switch member 70 are fastened together. Further, a screw thread T3 is passed through the screw-thread hole 831B of the locking bracket 80, and then screwed into the third internal screw thread portion 633 so that the locking bracket 80 is fastened. Further, a screw thread T4 is passed through the screw-thread hole 714A of the switch member 70, and then screwed into the fourth internal screw thread portion 634 so that the switch member 70 is fastened. Hereby, the switch member 70 and the locking bracket 80 are attached to the shield 60R. At this time, as illustrated in FIGS. 2, 4, and 6, the rear end 851B of the slope face portion 851 of the hood portion 85 is positioned on a slightly rear side relative to the rear end of the connector portion 75, the right end 851R thereof is positioned generally right above the right end of the connector portion 75, and the left end 851L thereof is positioned so as to project relative to the left end of the connector portion 75 just by a dimension generally the same as a thickness dimension of the connector portion 75 in the right-left direction.

When the switch member 70 and the locking bracket 80 are attached to the shield 60R, the terminal portion of the wiring harness 77 (see FIG. 2) is connected to the connector portion 75 of the switch member 70. After that, as illustrated in FIG. 5, the connection protruding portion 87 of the locking bracket 80 is passed through the locking hole 31A of the right side frame 31, and the shield 60R is attached to the right side frame 31. At this time, the left parts 872L of the first reinforcing portions 872 of the connection protruding portion 87 and the left parts 873L of the second reinforcing portions 873 thereof guide the connection protruding portion 87 to be passed through the locking hole 31A by their inclined structure. As the connection protruding portion 87 is passed through the locking hole 31A, the engaging pawl 874 of the connection protruding portion 87 abuts with the lower peripheral portion of the locking hole 31A, so as to warp upward. When the stopper portion 872S of the first reinforcing portion 872 of the connection protruding portion 87 abuts, from the right side, with upper and lower peripheral portions of the locking hole 31A of the right side frame 31, the engaging pawl 874 of the connection protruding portion 87 returns to its original state due to an elastic restoring force, so as to be locked to the lower peripheral portion of the locking hole 31A. Hereby, the locking bracket 80 is locked to the right side frame 31. At this time, as illustrated in FIG. 4, the suspended portion 853 of the hood portion 85 is positioned on the left side relative to the right slide rail 40. On this account, when a foreign matter moves leftward on the slope face portion 851 of the hood portion 85 and falls down from the left end 851L, the foreign matter falls along the suspended portion 853 to a position that does not interfere with the slide rail 40.

The present embodiment thus configured has the following effects. When the front flange portion 711, the rear flange portion 712, and the central flange portion 714 of the switch member 70, and the upper flange portion 821 and the lower flange portion 831 of the locking bracket 80 are fixed to the shield 60R, the vertically extending portion 81 of the locking bracket 80 straddles over (covers) a part of the switch member 70 from the left side. Since the vertically extending portion 81 is provided with the connection protruding portion 87 connected to the right side frame 31, the connection protruding portion 87 can be connected to a region opposed to the switch member 70, in the right side frame 31. This makes it possible to connect the shield 60R to the right side frame 31 at a position where the switch member 70 is disposed and to restrain the shield 60R from wobbling with respect to the right side face portion of the seat cushion 10. Further, the upper flange portion 821 of the locking bracket 80 and the rear flange portion 712 of the switch member 70 are put on top of one another and are fixed together to the shield 60R by the screw thread T2. Accordingly, in this part, by an operation of fastening one screw thread T2, the upper flange portion 821 of the locking bracket 80 and the rear flange portion 712 of the switch member 70 can be both fixed to the shield 60R. This makes it possible to restrain a decrease in assembly workability.

A specific embodiment has been described above, but the invention is not limited to the appearance and the configuration described in the above embodiment, and various modifications, additions, and deletions are performable as far as they do not change a gist of the invention.

For example, the present embodiment exemplifies a structure in which the locking bracket 80 is attached to the shield 60R at two places, i.e., the upper flange portion 821 and the lower flange portion 831. However, the present invention is not limited to this, and the locking bracket 80 may be fixed to the shield 60R at three or more places. Further, the present embodiment exemplifies a structure in which the switch member 70 and the locking bracket 80 are fastened together only at one place. However, the present invention is not limited to this, and they may be fastened together at several places.

Further, the present embodiment exemplifies a structure in which all of the front flange portion 711, the rear flange portion 712, and the central flange portion 714, which are attachment portions of the switch member 70, are fixed to the shield 60R by the screw, threads T as fastening members. However, the present invention is not limited to this, and if at least one of the flange portions is fastened together with the first connection portion of the locking bracket 80, the others thereof may be fixed to the shield 60R by a method other than the fastening.

Further, in the present embodiment, the present invention is applied to the right side face portion of the seat cushion 10. However, the present invention is not limited to this, and the present invention may be applied to the left side face portion of the seat cushion 10.

Further, in the present embodiment, the present invention is applied to a vehicle seat, but may be applied to seats to be provided in an airplane, a ship, a train, and the like.

What is claimed is:

1. A vehicle seat comprising:
    a seat cushion;
    a shield attached to a side face portion of the seat cushion;
    an electrical component disposed between the side face portion and the shield and including attachment portions fixed to a first member, the first member being either one of the side face portion and the shield; and
    a locking bracket including first connection portions fixed to the first member, and a second connection portion connected to a second member, the second member being the other one of the side face portion and the shield, the locking bracket being placed so as to cover a part of the electrical component from a second-member side when the attachment portions and the first connection portions are fixed to the first member.

2. The vehicle seat according to claim 1, wherein the second connection portion is connected to a region of the second member, the region facing the electrical component.

3. The vehicle seat according to claim 1, wherein the locking bracket is configured such that a plurality of leg portions is connected to each other by a girder portion, the plurality of leg portions each having a corresponding one of the first connection portions on one end side.

4. The vehicle seat according to claim 1, wherein at least one of the first connection portions and at least one of the attachment portions are put on top of one another and fixed together to the first member by a fastening member.

5. The vehicle seat according to claim 1, further comprising:
    a locking hole to which the second connection portion is inserted;
    a pawl formed on the second connection portion; and
    a stopper formed on the second connection portion, wherein
    the pawl is configured to abut the locking hole from the second-member side and the stopper is configured to abut the locking hole from a first-member side so that the locking bracket is locked and is fixed to the first member.

6. The vehicle seat according to claim 5, further comprising:
    a reinforcing portion formed on the second connection portion, wherein
    the reinforcing portion is a ridge projecting from the second connection portion and extending from the second member to the first member, and
    a projection dimension of the reinforcing portion from the second connection portion is gradually increased toward the first member.

7. The vehicle seat according to claim 1, further comprising:
    a rail to which the seat cushion is connected; and
    a hood portion formed on the second connection portion, the hood portion including:
        a slope face extending downward from an outer side of the vehicle seat to an inner side of the vehicle seat, and
        a suspended portion extending downward from an end of the slope face which is on the inner side of the vehicle seat, wherein
        the suspended portion is located on the inner side of the vehicle in comparison with the rail.

* * * * *